United States Patent [19]

Fukaya et al.

[11] Patent Number: 4,751,411
[45] Date of Patent: Jun. 14, 1988

[54] STEP MOTOR

[75] Inventors: Katsuyoshi Fukaya, Obu; Takashi Kubota, Aichi, both of Japan

[73] Assignee: Aisan Kogyo Kabushiki Kaisha, Obu, Japan

[21] Appl. No.: 907,922

[22] Filed: Sep. 16, 1986

[30] Foreign Application Priority Data

Sep. 30, 1985 [JP] Japan .................. 60-149784[U]

[51] Int. Cl.$^4$ ........................................ H02K 37/00
[52] U.S. Cl. .................... 310/49 R; 310/80; 310/83
[58] Field of Search ...................... 310/49, 80, 83

[56] References Cited

U.S. PATENT DOCUMENTS

| | | | |
|---|---|---|---|
| 2,978,621 | 4/1961 | Martinek | 310/83 X |
| 3,159,758 | 12/1964 | Hemperley, Jr. et al. | 310/83 |
| 4,333,026 | 6/1982 | Bock et al. | 310/49 X |
| 4,381,747 | 5/1983 | Kobayashi et al. | 310/49 X |
| 4,393,319 | 7/1983 | Bock | 310/49 X |
| 4,438,361 | 3/1984 | Manson | 310/49 X |
| 4,480,614 | 11/1984 | Kobashi et al. | 310/49 X |
| 4,496,865 | 1/1985 | Allen et al. | 310/80 |
| 4,501,981 | 2/1985 | Hansen | 310/49 |
| 4,588,913 | 5/1986 | Adami | 310/49 X |

Primary Examiner—Patrick R. Salce
Assistant Examiner—Judson H. Jones
Attorney, Agent, or Firm—Armstrong, Nikaido, Marmelstein & Kubovcik

[57] ABSTRACT

A step motor of the linear type is composed of a shaft threadedly engaged with an inner hole provided in a rotor and is driven in the axial direction by rotation of the rotor. A bearing for slidably supporting the shaft for axial movement is installed in a rear cover for covering the rear end of the shaft and an enclosing member for the rear end of the shaft is formed in the rear cover. A spring shoe and a coil spring are fitted to the rear end of the shaft enclosed in the enclosing member. Consequently, the assembly of the coil spring and the spring shoe becomes simple, and the coil spring is not exposed. The form of the front portion of the step motor is made more compact in comparison to that of the prior art where the coil spring is externally installed to the front end of the shaft.

6 Claims, 2 Drawing Sheets

STEP MOTOR

BACKGROUND OF THE INVENTION

1. Field of the Invention

The present invention relates to a step motor of linear type, wherein a shaft is threadedly engaged with an inner hole provided on a rotor and is driven in the axial direction by the rotation of the rotor.

2. Description of the Prior Art

In the prior art, a step motor of linear type, in which a shaft having a male screw is threadedly engaged with a female screw provided on an inner hole of a rotor and is driven in the axial direction by the rotation of the rotor, has been used to drive of a flow rate control valve as disclosed in Japanese patent application laid-open No. 210139/1982, for example.

As shown in FIG. 1, the step motor comprises a housing 31, a stator 32 fixed in the housing 31, a rotor 33 with a magnet member rotatably supported by an inner race of a ball bearing 34, a female screw provided on an inner hole of the rotor 33, and a shaft having a male screw threadedly engaged with the inner hole of the rotor 33 and slidably supported in the axial direction by a front bearing 36 and a rear bearing 37. A coil spring 38 is externally installed to the front end portion of the shaft 35 in order to eliminate backlash of the screw member and prevent chattering of the shaft 35, and the shaft 35 is normally biased to the left in FIG. 1 by the coil spring 38.

In the step motor of linear type in the prior art, however, since the front end portion of the shaft is lengthened and the coil spring is fitted to the lengthened portion, the step motor has structure with the front portion projected and is difficult to be assembled to other devices. Furthermore, during the manufacturing, assembling property of parts including the coil spring is bad and the number of assembling processes increases.

SUMMARY OF THE INVENTION

A step motor of the invention is constituted in that a shaft is threadedly engaged with an inner hole provided on a rotor and is driven in the axial direction by rotation of the rotor, a bearing slidably supporting the shaft is fitted in a rear cover for covering rear side of the shaft, and an enclosing member for rear end portion of the shaft is formed in the rear cover so that a spring shoe and a coil spring to be fitted to the rear end portion of the shaft are enclosed in the enclosing member.

An object of the invention is to provide a step motor of linear type wherein a coil spring is enclosed in a cover of rear end portion of a shaft, thereby structure of front end portion of the shaft is made compact and the assembling work during manufacturing can be esily performed.

DESCRIPTION OF THE PREFERRED EMBODIMENT

An embodiment of the invention will now be described referring to the accompanying drawings.

Figure 1:
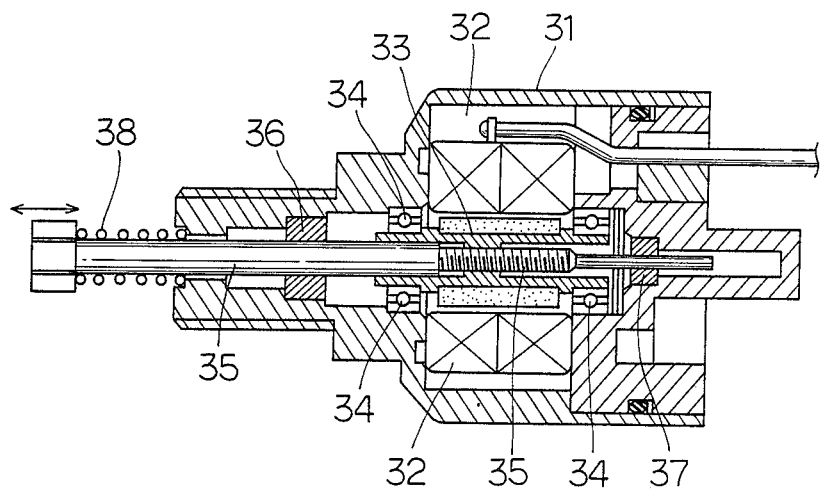
FIG. 1 is a sectional view of a step motor of linear type in the prior art.
Figure 2:
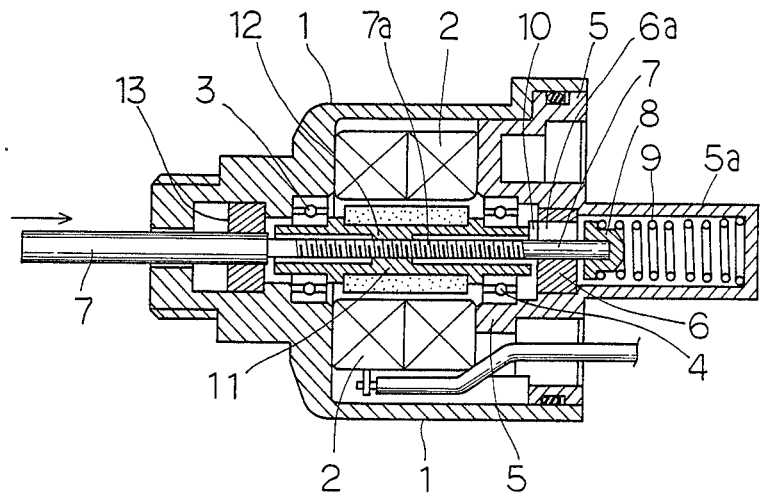
FIG. 2 is a sectional view of a step motor of linear type as an embodiment of the invention.
Figure 3:
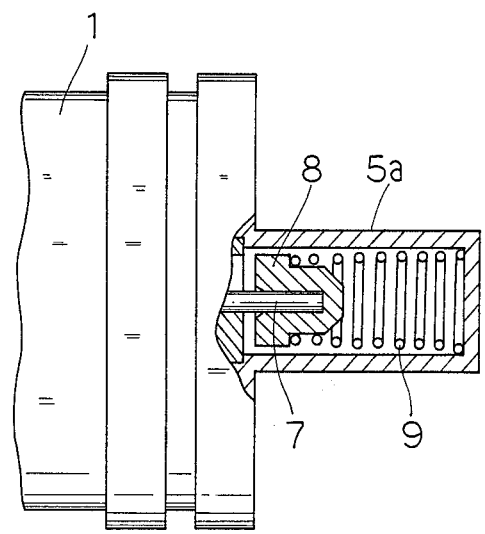
FIG. 3 is a partial enlarged sectional view of a rear cover of the step motor.

FIG. 2 shows a sectional view of a step motor of linear type. A stator coil 2 is wound on inner circumferential portion of a motor housing 1 of cylindrical form, and on inside of the stator coil 2 is arranged a ball bearing 3 for rotor with its outer circumferential portion fixed. Numeral 5 designates a rear cover fitted to rear side of the motor housing 1, and a ball bearing 4 for rotor is fitted on the inside center of the rear cover 5 in coaxial relation to the ball bearing 3. A rear bearing 6 for shaft is fitted to rear inside of the ball bearing 4 so that a shaft 7 as hereinafter described is supported slidable in the axial direction by the bearing 6. An enclosing member 5a for enclosing rear end portion of the shaft 7 is projected rearward at the center of the rear cover 5, and a spring shoe 8 and a coil spring 9 are inserted in the enclosing member 5a as clearly seen in FIG. 3. The coil spring 9 is formed of smaller diameter at front side than at rear side, and the front end portion of smaller diameter of the coil spring 9 is securely fitted to the spring shoe 8. A slit 6a which allows a stopper pin 10 projected on the shaft 7 for front traveling end limiting to pass is provided on upper side of the inner hole of the bearing 6.

A magnet member of a rotor 11 is arranged on inside of the stator coil 2 with a small spacing, and an inner cylinder of the rotor 11 is fixed to an inner race of the ball bearings 3 and 4 thereby the rotor 11 is rotatable on inside of the stator coil 2. A female screw 12 is provided on inner circumferential portion of the rotor 11, and is threadedly engaged with a male screw threaded at intermediate portion of the shaft 7. The shaft 7 is slidably supported at rear portion (to the right in FIG. 2) by the bearing 6 and at front portion (to the left in FIG. 2) by a bearing 13. The front portion of the shaft 7 is formed not in a round bar but with a noncircular cross-section, e.g., with a flat portion on a part of the outer circumference, so as to prevent the rotation. The bearing 13 supporting the shaft 7 is provided with the inner hole having nearly the same sectional form as that of the noncircular cross-section of the shaft 7, thereby when the rotor 11 is rotated the shaft 7 is not rotated but slided in the axial direction.

During the manufacturing process of the step motor of such structure, the coil spring 9 and the spring shoe 8 are inserted in the enclosing member 5a of the rear cover 5, and the bearing 6 is fitted in the inside center of the rear cover 5 so that the coil spring 9 and the spring shoe 8 are shut in the enclosing member 5a. In this state, if the rear cover 5 is fitted and fixed to the rear portion of the motor housing 1 in which the rotor 11 and the shaft 7 are installed, the rear end portion of the shaft 7 is finely fitted to the spring shoe 8 and the step motor can be assembled simply and rapidly in spite of existence of the coil spring 9.

A valve body of a valve (not shown) or the like may be mounted on the front end of the shaft 7 of the step motor, or may be molded integrally with the shaft. The step motor is used in flow rate control of fluid and operated as follows. First, pulse signals with shifted phases are supplied in sequence to respective magnetic poles of the stator coil 2, thereby the alternating magnetic field varying in sequence in the circumferential direction is generated and the rotor 11 is rotated in prescribed direction. When the shaft 7 is moved, for example, to the right in FIG. 2 by the rotation of the rotor 11, the coil spring 9 is compressed and the shaft 7 is normally biased to the left by the coil spring 9, so that backlash of the screw member between the shaft 7 and the rotor 11 is prevented and the drive can be effected at high accuracy.

According to the step motor of the invention as above described, since the coil spring biasing the shaft in the axial direction is enclosed in the enclosing member for shaft rear end portion which is projected at the center of the rear cover, during the manufacturing process of the step motor, the coil spring together with the spring shoe is entered in the enclosing member and the rear cover is only mounted on the motor housing, thereby various parts including the coil spring can be easily assembled and the number of assembling processes can be reduced and the manufacturing cost be decreased. Since the coil spring is entered in the enclosing member for enclosing the rear end portion of the shaft, the coil spring is not exposed at the front end of the shaft although done in the prior art and structure of the front end of the step motor can be made compact.

What is claimed is:

1. A step motor comprising:
   (a) a housing having a front end and a rear end;
   (b) a stator coil fixed in the housing;
   (c) a pair of rotor bearings arranged in the housing;
   (d) a rotor rotatably arranged inside of the stator coil supported by said rotor bearings, said rotor being provided with a female screw thread on an inner circumferential surface;
   (e) a front bearing for slidably supporting a shaft arranged on the front end of the housing;
   (f) a rear bearing for slidably supporting a shaft arranged on the rear of the housing;
   (g) a shaft having formed thereon a male screw thread engaged with the female screw thread on the inner circumferential surface of the rotor, said shaft being positioned in the rotor and slidably supported at a front end and a rear end by the front bearing and the rear bearing, respectively, for movement in the axial direction, the front end of said shaft extending from said housing for mounting a mechanism thereon;
   (h) a rear cover installed at said rear end of the housing and formed with an enclosing member projecting rearwardly for enclosing the rear end of said shaft; and
   (i) a coil spring positioned in the rear cover, one end of said spring abutting against the inside of the enclosing member and the other end of said spring being connected to said shaft by a spring shoe so as to exert force between the inside of the enclosing member and the shaft for biasing the shaft in the forward axial direction.

2. A step motor as set forth in claim 1, wherein a stopper pin for limiting travel of the front end projects radially at said rear end of the shaft, and the rear shaft bearing has a slot formed therein to allow the stopper pin to pass through.

3. A step motor as set forth in claim 1, wherein a non-circular sectional portion is formed at said front end of the shaft, and an inner hole of the front bearing is formed in a shape corresponding to the non-circular cross-section of the shaft.

4. A step motor comprising:
   (a) a housing having a front end and a rear end;
   (b) a rear cover fitted to said rear end of the housing;
   (c) a stator coil fixed in the housing;
   (d) a bearing for a rotor installed in the front of the housing and another bearing for said rotor installed in the rear cover, both bearings being arranged in coaxial relation;
   (e) a rotor rotatably positioned inside the stator coil on the rotor bearings, said rotor being provided with a female screw thread on an inner circumferential surface;
   (f) a front shaft bearing arranged at said front end of the housing;
   (g) a rear shaft bearing installed in said rear cover;
   (h) a shaft having formed externally thereon a male screw thread engaged with the female screw thread in the inner circumferential surface of the rotor, said shaft being inserted in the rotor and slidably supported for movement in the axial direction by the front shaft bearing and the rear shaft bearing;
   (i) an enclosing member connected to said rear cover and extending rearwardly from the rear cover for enclosing the rear end of the shaft; and
   (j) a coil spring positioned in the rear cover enclosing member and abutting at one end against the inside of the enclosing member, the other end of said coil spring being connected to said shaft by means of a spring shoe so as to exert force between the inside of the enclosing member and the shaft for biasing the shaft in the forward axial direction.

5. A step motor as set forth in claim 4, wherein a stopper pin for limiting front end travel projects radially at a rear portion of the shaft, and the rear shaft bearing has a slot formed therein for allowing the stopper pin to pass through.

6. A step motor as set forth in claim 4, wherein a non-circular sectional portion is formed longitudinally at a front portion of the shaft, and the front shaft bearing is formed with an inner hole of a shape corresponding to the non-circular cross-section of the shaft.

* * * * *